US009514136B2

(12) United States Patent
Scheer et al.

(10) Patent No.: US 9,514,136 B2
(45) Date of Patent: Dec. 6, 2016

(54) CLOUD BASED MANAGEMENT FOR MULTIPLE CONTENT MARKERS

(71) Applicant: Verizon Patent and Licensing Inc., Basking Ridge, NJ (US)

(72) Inventors: Fred Scheer, Bradford, MA (US); Gaurav A. Tanna, Brighton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 444 days.

(21) Appl. No.: 14/061,357

(22) Filed: Oct. 23, 2013

(65) Prior Publication Data

US 2015/0113000 A1    Apr. 23, 2015

(51) Int. Cl.
*G06F 17/30* (2006.01)

(52) U.S. Cl.
CPC .............................. *G06F 17/30064* (2013.01)

(58) Field of Classification Search
CPC ................. G06F 17/30017; G06F 17/3002; G06F 17/30029
USPC .......................................................... 707/746
See application file for complete search history.

(56) References Cited

U.S. PATENT DOCUMENTS

| 6,091,886 A * | 7/2000 | Abecassis ............... A63F 13/10 348/E5.102 |
| 2004/0220926 A1* | 11/2004 | Lamkin ............. G06F 17/30017 |
| 2004/0223737 A1* | 11/2004 | Johnson ............... G11B 27/034 386/241 |
| 2010/0027966 A1* | 2/2010 | Harrang ................. H04N 5/775 386/241 |
| 2010/0042642 A1* | 2/2010 | Shahraray ......... G06F 17/30884 707/756 |
| 2014/0281896 A1* | 9/2014 | Wiitala ............... G06F 17/2247 715/234 |
| 2014/0282755 A1* | 9/2014 | Alsina ................ H04N 21/6587 725/88 |

\* cited by examiner

*Primary Examiner* — Hosain Alam
*Assistant Examiner* — Robert F May (57) ABSTRACT

A first device may receive an instruction to add a first marker that identifies a first time index associated with particular content and a particular account used to access the particular content; receive an instruction to add a second marker that identifies a second time index associated with the particular content and the particular account; store the first marker and information associating the first marker with the first time index, the particular content, and the particular account; store the second marker and information associating the second marker with the second time index, the particular content, and the particular account; receive selection of the first marker or the second marker, associated with the particular content and the particular account; and cause a second device to play back the particular content at the first time index or the second time index.

20 Claims, 8 Drawing Sheets

```
┌─────────────────────────┐
│    User Information     │
│          510            │
│   User ID: User 123     │
│    Marker Slots: 5      │
└─────────────────────────┘
```

| Content 520 | Markers 530 | |
|---|---|---|
| | Time Index | Name |
| Content 1 | 0:23:39 | Mom |
| | 0:45:42 | Dad |
| | 1:22:43 | Billy |
| | 0:12:35 | Emily |
| Content 2 | 0:02:30 | Chapter 1 |
| | 0:20:45 | Chapter 2 |
| | 1:15:23 | Chapter 3 |
| | 0:13:39 | Mom |
| | 1:02:32 | Emily |
| | 01:12:02-01:13:23 | Restricted |

CLOUD BASED MANAGEMENT FOR MULTIPLE CONTENT MARKERS

BACKGROUND

Content providers can provide content (e.g., audio content, video content, web content, etc.) to user devices over a network. A user may maintain a user account with a content provider in order to access content. When accessing content, the user can pause playback of the content, such that when the content is later accessed, playback of the content can be resumed at a time index corresponding to where the playback of the content was paused. When multiple users access the content using a common user account, each of the multiple users may not pause playback of the content at the same time index. As a result, the multiple users may need to manually navigate (e.g., fast forward/rewind) through the content to resume playback of the content at a desired time index.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may store multiple time index markers (herein after referred to as "markers") for particular content provided by a content provider. In some implementations, a particular marker may be generated and may correspond to a time index in which playback of the content has been paused. In some implementations, the particular marker may be later selected such that playback of the content may occur at a time index corresponding to the marker.

In some implementations, multiple users may access particular content using a common account, view the particular content independently, and may generate individual markers where playback has been paused by each user and may later be resumed for each user. For example, a first user may generate a first marker corresponding to a first time index where the first user paused playback of the particular content. A second user may generate a second marker corresponding to a second time index where the second user paused playback of the particular content.

In some implementations, markers may also correspond to chapters associated with the particular content, users' favorite scenes, restricted scenes that may be skipped, or time indexes in the particular content associated with particular attributes of the particular content.

Figure 1A:
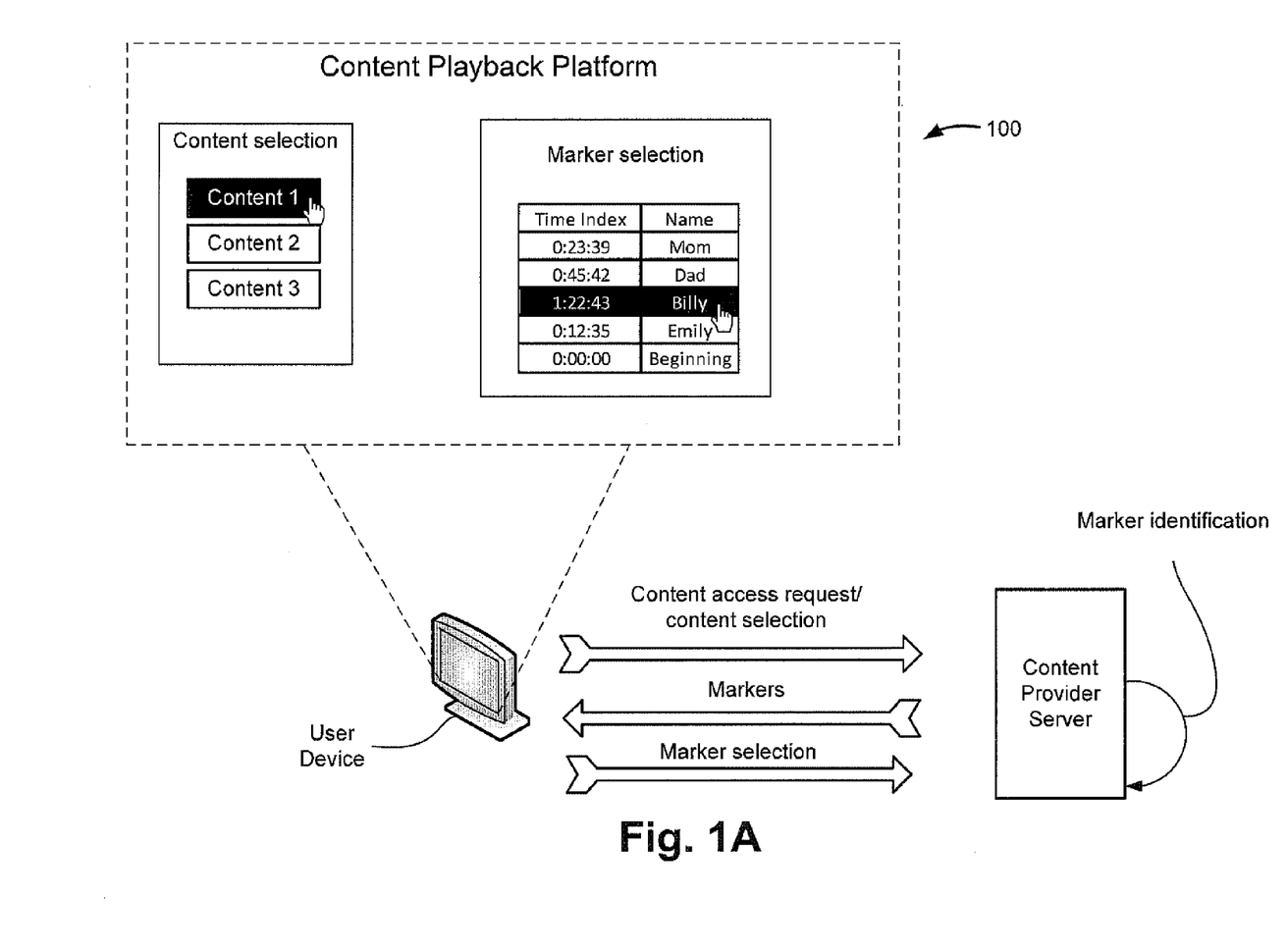
FIGS. 1A-1B illustrate an example overview of an implementation described herein.
Figure 1B:
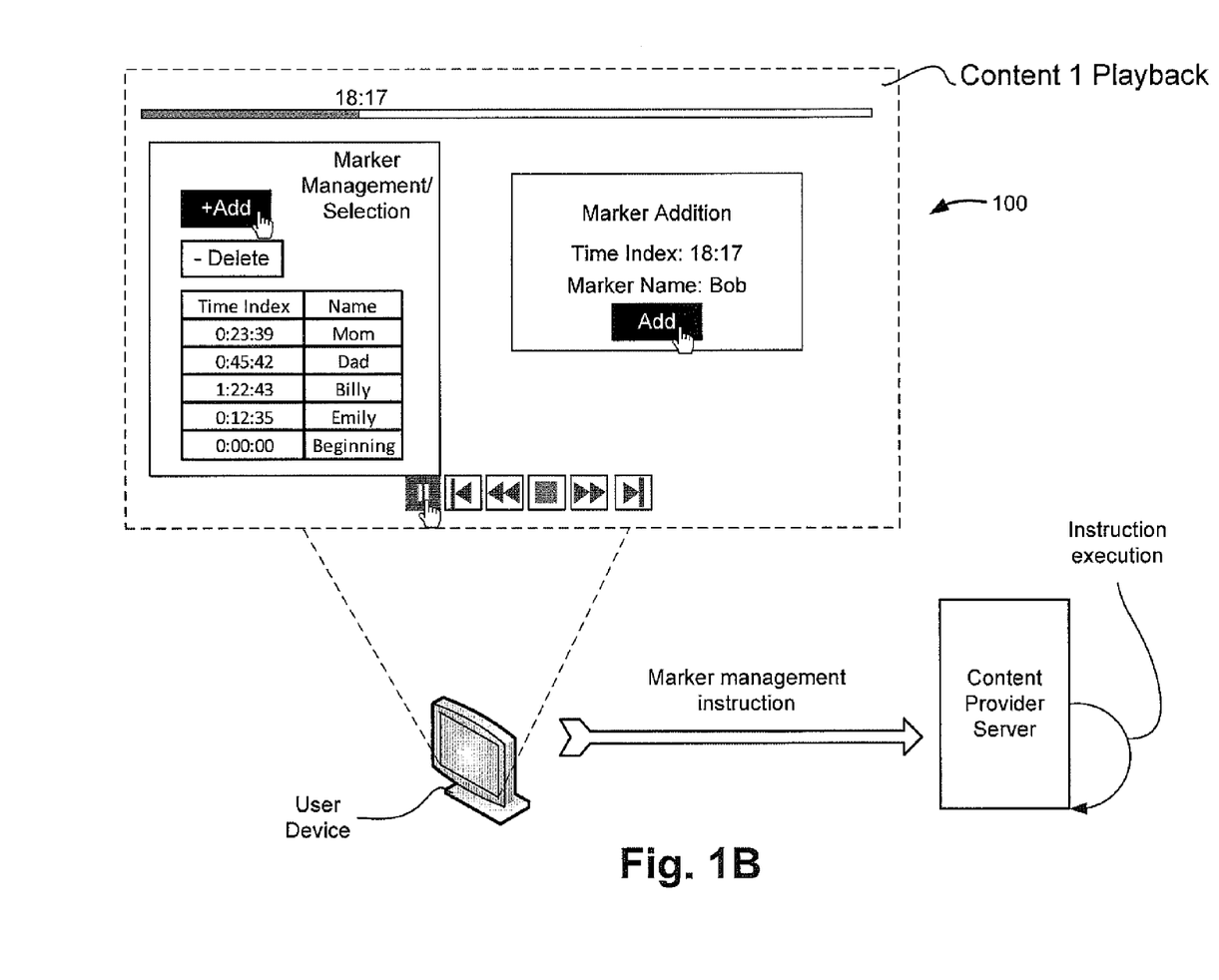

FIGS. 1A-1B illustrate an example overview of an implementation described herein. As shown in FIG. 1A, a user device may provide a content access request to a content provider server via a content playback platform shown in interface 100. For example, the user device may provide account related information, such as login information and/or some other information that authorizes the user to access content stored by the content provider server.

In some implementations, the user device may receive a selection of particular content, such as Content 1 (e.g., from the user of the user device via interface 100), and may provide the content selection to the content provider server. In some implementations, the content provider server may identify one or more markers that are associated with the selected content and with the account information (e.g., markers that have been previously generated and associated with the account information and the particular content). In some implementations, the content provider server may provide information identifying the markers to the user device.

As shown in interface 100, the user device may display a list of markers associated with the selected content. In some implementations, each marker, in the list of markers, may include a time index and a name (e.g., a user-selectable description of the marker). In some implementations, the user device may receive a selection of a particular marker and may provide a marker selection (e.g., information identifying the selection of the particular marker) to the content provider server. In some implementations, the content provider server may provide the content to the user device such that the user device begins playback of the content at the time index associated with the selected marker.

Referring to FIG. 1B, the user device may receive a selection (e.g., from the user) to pause playback of the selected content (e.g., Content 1) and to display a marker management/selection menu (e.g., as shown in interface 100). In some implementations, the user may provide the selection to pause the playback and to display the marker management/selection menu, for example, by depressing a pause button on an accessory device (e.g., a remote control associated with the user device) for greater than a threshold amount of time. Additionally, or alternatively, the user may provide the selection to pause the playback and to display the marker management/selection menu using some other technique. In the example shown in FIG. 1B, the user device may pause playback of Content 1 at the time index 18:17 (i.e., 18 minutes and 17 seconds).

In some implementations, the user device may receive a selection to add a marker at the time index at which Content 1 has been paused. Based on receiving the selection to add the marker, the user device may present an option to add a description (e.g., a name) for the marker. In some implementations, the user may input the description via an accessory device (e.g., a remote control, a keyboard, etc.) associated with the user device. In some implementations, the user device may provide a marker management instruction (e.g., an instruction to store a marker associated with the time index and the description) to the content provider server. In some implementations, the content provider server may receive the marker management instruction and may store information relating to the marker. Further, the content provider server may associate the marker with Content 1 and with an account of the user.

As a result, multiple markers for particular content may be generated such that when multiple users access the particular content via a common account, playback can be resumed from one of multiple time indexes. For example, a first user may resume playback from a first time index (e.g., corresponding to when the first user paused playback of the particular content), and a second user may resume playback from a second time index (e.g., corresponding to when the second user paused playback of the particular content). Further, markers can be shared with other users and saved to other users' respective accounts. In some implementations, markers may be provided by a publisher of the particular content and may correspond to chapters associated with the particular content. In some implementations, markers may correspond to metadata associated with the particular content, and may be automatically generated based on pixel-based classification techniques. For example, a marker can identify particular objects (e.g., people, audio, or the like) and may identify a time index in the content in which the particular objects are present.

Figure 2:
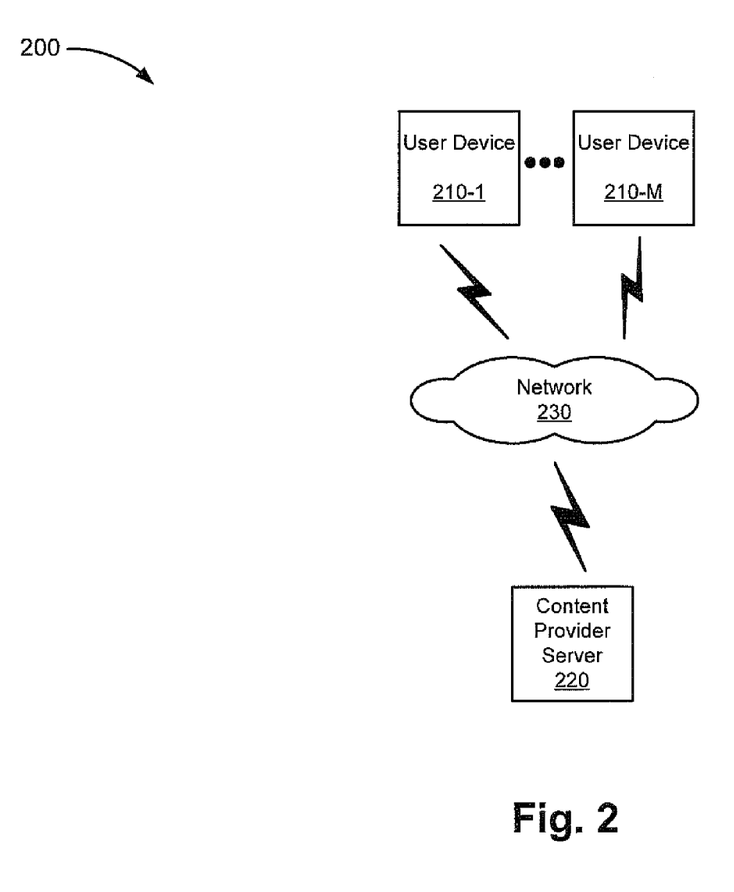
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), content provider server 220, and network 230.

User device 210 may include any device capable of communicating via a network, such as network 230. For example, user device 210 may correspond to a mobile communication device (e.g., a smart phone or a personal digital assistant (PDA)), a portable computer device (e.g., a laptop or a tablet computer), a gaming device, a desktop computing device, a set-top box, a media player, or another type of device. In some implementations, user device 210 may communicate with content provider server 220 to request content, receive the content, and present the content via a user interface of user device 210. In some implementations, user device 210 may request content playback at a particular time index associated with a marker. In some implementations, user device 210 may receive instructions to add, delete, and/or modify a marker.

Content provider server 220 may include one or more computing devices, such as a server device or a collection of server devices. In some implementations, content provider server 220 may store content and may deliver content to user device 210 via network 230. In some implementations, content provider server 220 may store user account/subscription information that may be used to authorize user device 210 to receive content in exchange for payment. In some implementations, content provider server 220 may store/maintain information associating one or more markers with particular content and with a particular user account.

In some implementations, a first user device 210 (e.g., user device 210-1) may receive an instruction to add a marker associated with particular content and with a particular user account provide the instruction to content provider server 220. In some implementations, content provider server 220 may store information associating the marker with the particular content and the particular user account. In some implementations, a second user device 210 (e.g., user device 210-2) may access the particular content, using the particular user account, from content provider server 220. In some implementations, user device 210-2 may receive information identifying the marker from content provider server 220 and may select that marker. That is, a marker may be generated via user device 210-1 and later selected via user device 210-2.

Network 230 may include one or more wired and/or wireless networks. For example, network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 230 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
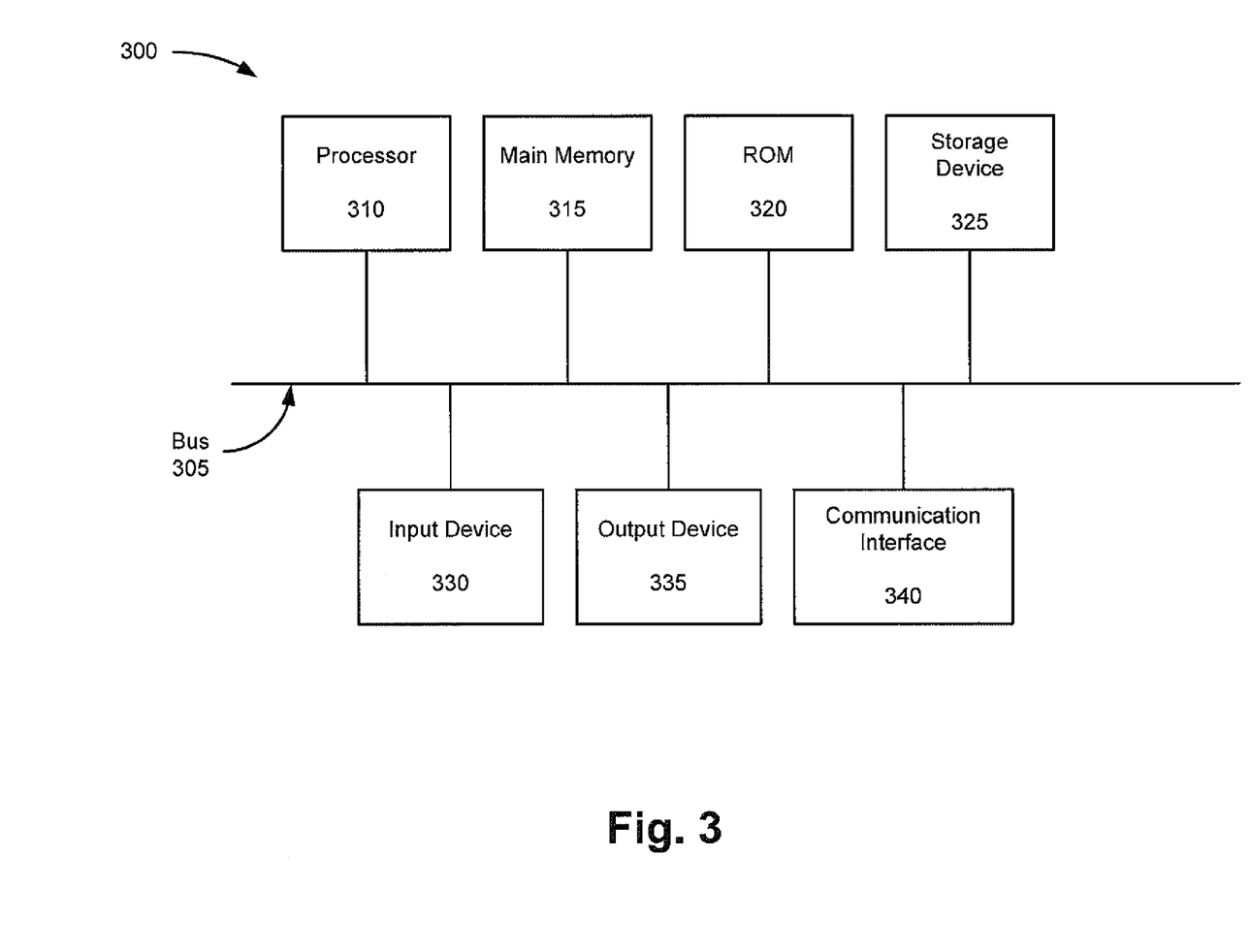
FIG. 3 illustrates example components of a device that may be used within the environment of FIG. 2.

FIG. 3 illustrates example components of a device 300 that may be used within environment 200 of FIG. 2. Device 300 may correspond to user device 210 and/or content provider server 220. Each of user device 210 and/or content provider server 220 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
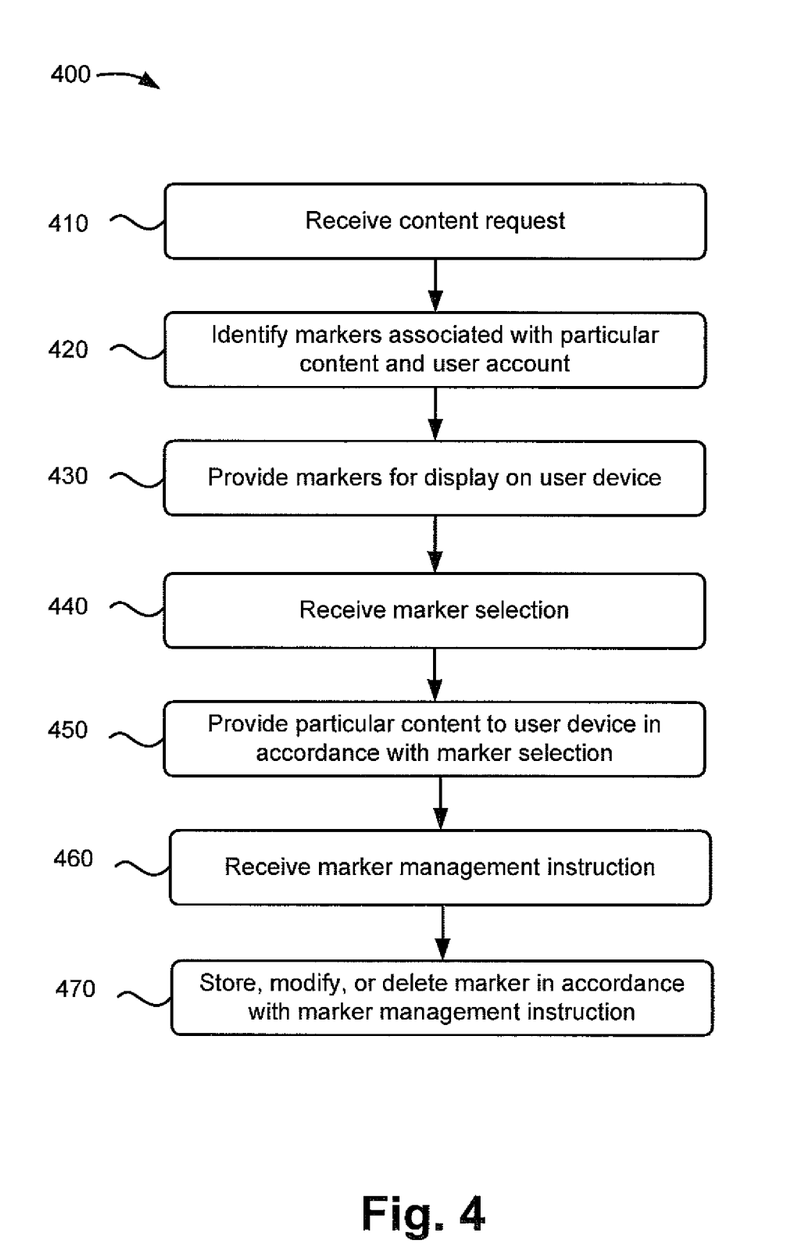
FIG. 4 illustrates a flowchart of an example process for managing markers and continuing playback of content at a time index identified by a marker.

FIG. 4 illustrates a flowchart of an example process 400 for managing markers and continuing playback of content at a time index identified by a marker. In one implementation, process 400 may be performed by one or more components of content provider server 220. In another implementation, some or all of blocks of process 400 may be performed by one or more components of another device in environment 200 (e.g., user device 210), or a group of devices including or excluding content provider server 220.

As shown in FIG. 4, process 400 may include receiving a content request (block 410). For example, content provider server 220 may receive the content request from user device 210. In some implementations, the content request may include login information (e.g., a username, password, etc.) that may be used to identify a user account and to authorize user device 210 to receive content. Further, the content request may include a selection of particular content to be provided to user device 210.

Process 400 may also include identifying markers associated with the particular content and the user account (block 420). For example, content provider server 220 may identify markers that have been linked to the particular content and to the user account identified in the content request. In some implementations, content provider server 220 may store a data structure that identifies markers that are linked to the particular content and the user account. As described in greater detail below, markers may be linked to the particular content and to the user account based on a marker management instruction provided by user device 210.

Process 400 may further include providing markers for display on the user device (block 430). For example, content provider server 220 may provide the identified markers for display on user device 210 (e.g., on a user interface of user device 210). In some implementations, user device 210 may display the markers in a list. In some implementations, the list may include a description of each marker and a time index associated with each marker. An example of providing the identified markers for display on user device 210 is shown in interface 100 of FIG. 1A.

Process 400 may also include receiving a marker selection (block 440). For example, content provider server 220 may receive a selection of marker from user device 210 (e.g., when a user of user device 210 selects the marker from a marker list presented on a user interface of user device 210). In some implementations, the marker selection may include a description of the marker to permit content provider server 220 to identify the selected marker.

Process 400 may further include providing the particular content to the user device in accordance with the marker selection (block 450). For example, content provider server 220 may provide the particular content to user device 210 with an instruction to cause user device 210 to play back the particular content at a time index corresponding to the marker. As an example, assume that content provider server 220 receives the marker having the description "Marker 1." Further, assume that Marker 1 is associated with the time index of 18:17. Given these assumptions, content provider server 220 may provide the particular content along with an instruction to direct user device 210 to play back the particular content beginning at the time index of 18:17. In some implementations, a marker may correspond to a time period instead of a single time index. When the marker corresponds to a time period instead a single time index, content provider server 220 may provide the particular content to user device 210 with an instruction to cause user device 210 to play back the content while skipping playback, or fast-forwarding though the content, during the time period (e.g., for content that may be restricted, such as content relating to a parental control), or to play back the content during the time period (e.g., for content relating to a user's favorite content).

Process 400 may also include receiving a marker management instruction (block 460). For example, content provider server 220 may receive a marker management instruction from user device 210. In some implementations, the marker management instruction may include an instruction to add, remove, or modify a marker in connection with the particular content and the user account. In some implementations the marker management instruction may include a description of the marker and a time index associated with the marker. In some implementations, the marker management instruction may identify the particular content and the user account.

As described above, a user may access a marker management menu (e.g., to generate the marker management instruction) by depressing a pause button on an accessory device (e.g., a remote control associated with user device 210) for greater than a threshold amount of time. Additionally, or alternatively, the user may access the marker management menu using some other technique. In some implementations, the user may select to add, remove, or modify a marker via the market management menu. For example, the user may add a marker corresponding to a time index at which playback of the particular content has been paused. Additionally, or alternatively, the user may add a marker corresponding to some other time index. In some implementations, the user may select to remove an existing marker by selecting the marker from a marker list in the marker management menu, and selecting a command (e.g., from the user interface of user device 210) to delete the marker. In some implementations, the user may select to modify an existing marker by selecting the marker from the marker list and selecting a command to modify an attribute of the marker (e.g., modify a description of the marker and/or a time index of the marker).

In some implementations, the marker management instruction may be received from some other source other than the user. For example, the marker management instruction may be received from a publisher associated with the particular content and may correspond to chapters in the particular content. In some implementations, the marker management instruction may be formed based on pixel-based classification information and may identify particular objects (e.g., people, audio, or the like) and may identify a time index in the particular content in which the particular objects are present. In some implementations, markers may be published and/or shared (e.g., by users associated with other user accounts) and may be selected to be added to the user account. In some implementations, markers may be purchased and added to the user account. In some implementations, markers may correspond to time periods in the particular content where playback is to be skipped (e.g., corresponding to parental controls, or portions of the particular content a user may not be interested in viewing).

Process 400 may further include storing, modifying, or deleting the marker in accordance with the marker management instruction (block 470). For example, content provider server 220 may maintain a data structure that identifies markers associated with the particular content and the user account. In some implementations, when the marker management instruction includes an instruction to add a marker, content provider server 220 may store information regarding the marker in the data structure to link the marker to the particular content and the user account. When the marker management instruction includes an instruction to remove a marker, content provider server 220 may delete the marker from the data structure. In some implementations, the data structure may be used to identify markers associated with the particular content and the particular user account in accordance with block 420 as described above. In some implementations, the data structure may include labels to identify users associated with the markers. An example of a data structure that maintains markers for particular content and a particular user account is described below with respect to FIG. 5. In some implementations (e.g., when a marker did not previously exist for the particular content and the user account), content provider server 220 may generate a marker with a description, such as "Beginning" and a time index of 0:00 such that the beginning of the content can be selected for playback.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. For example, blocks 420-440 may be omitted when a marker is not linked to the particular content and the user account.

Figure 5:
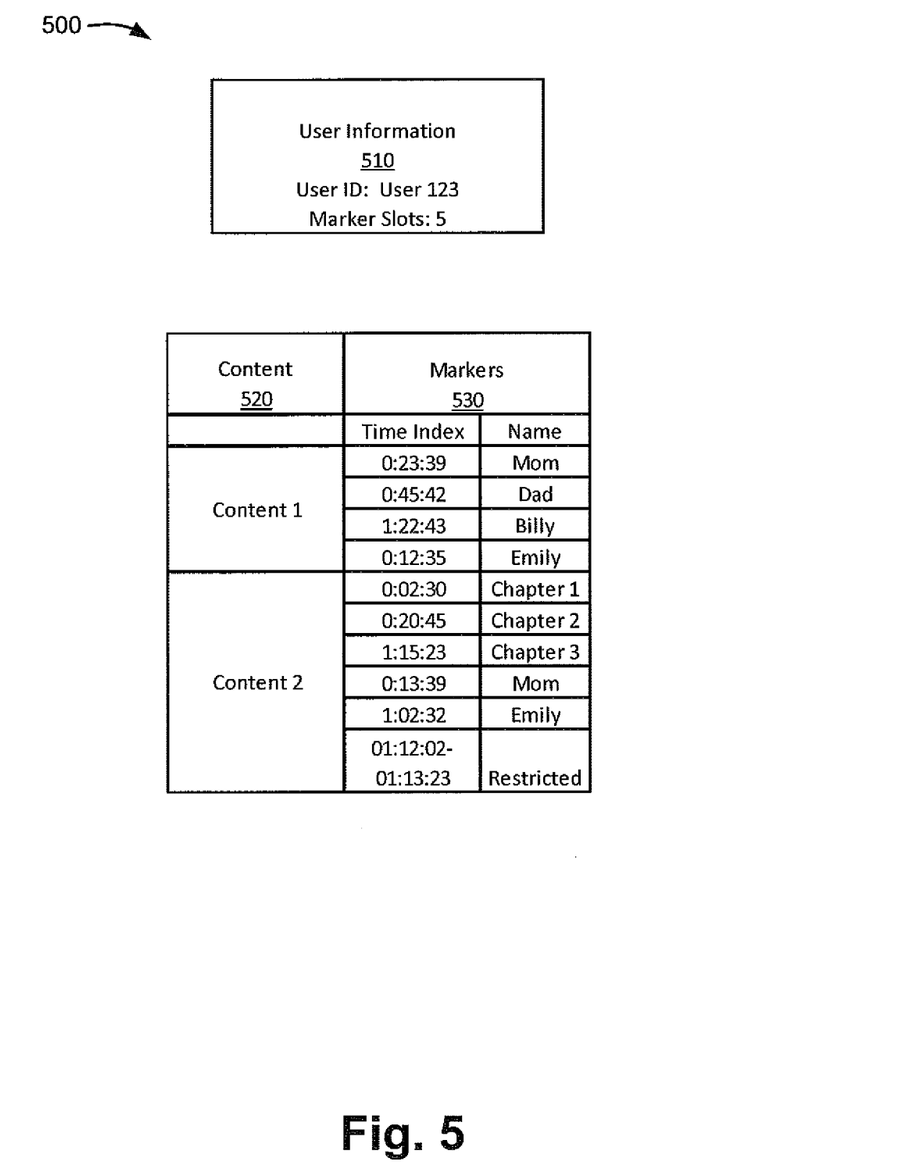
FIG. 5 illustrates an example data structure that may be stored by one or more devices in the environment of FIG. 2.

FIG. 5 illustrates an example data structure 500 that may be stored by one or more devices in environment 200, such as content provider server 220. In some implementations, data structure 500 may be stored in a memory of content provider server 220. In some implementations, data structure 500 may be stored in a memory separate from, but accessible by, content provider server 220. In some implementations, data structure 500 may be stored by some other device in environment 200, such as user device 210.

A particular instance of data structure 500 may contain different information and/or fields than another instance of data structure 500. In some implementations, data structure 500 may store information identifying markers associated with a particular user account. Another instance of data structure 500 may store information identifying markers associated with another user account.

As shown in FIG. 5, data structure 500 may include user information field 510, content field 520, and markers field 530.

User information field 510 may store information identifying a particular user account associated with a particular instance of data structure 500. In some implementations, user information field 510 may store an identifier of the user account (e.g., a user ID, or the like). In some implementations, user information field 510 may store information identifying an available quantity of marker slots, identifying an available quantity of markers (e.g., markers per content) that may be stored for the user account, or the like. In some implementations, the available quantity of markers may be based on a subscription level of the user account.

Content field 520 may store information identifying particular content that may include markers. For example, content field 520 may store an identifier of the particular content and/or some other information that may be used to uniquely identify the particular content.

Markers field 530 may store a list of markers associated with the particular content identified in content field 520 and the particular user account identified in user information field 510. In some implementations, each marker in markers field 530 may include a time index and a description (e.g., a name). In some implementations, the time index may identify a time at which playback of the content my begin when the marker is selected. For example, the time index may identify at time at which playback of the content was paused and may be later resumed. In some implementations, the description may identify a user associated with the marker, a description of a scene, or some other description selectable by the user associated with the marker. In some implementations, markers field 530 may identify a time period for a particular marker. In some implementations, the time period may identify a portion of the content may be skipped during playback of the content or a portion of the content that may be played back (e.g., without playing back another portion of the content not included in the time period identified by the particular marker).

In some implementations, information stored by data structure 500 may be based on marker management instructions received from user device 210. As an example, assume that user device 210 provides a marker management instruction, associated with the user account having the ID of User 123, to add a marker for Content 1 with description "Mom" at time index 0:23:39. Given this assumption, content provider server 220 may store, in data structure 500, a marker with the description "Mom," and the time index 0:23:39 in connection with Content 1 and the user account having the ID of User 123.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible.

Figure 6A:
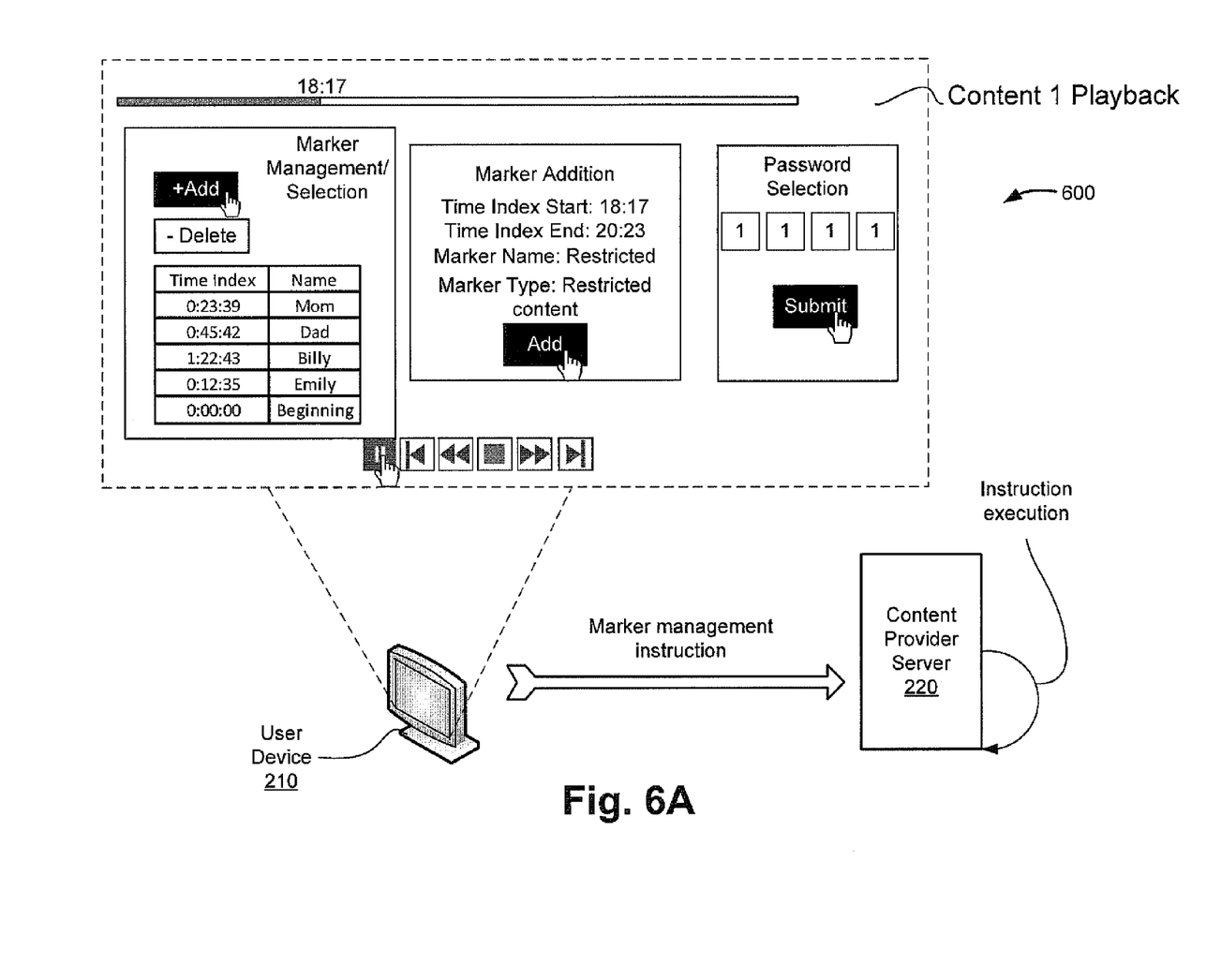
FIGS. 6A-6B illustrates an example implementation as described herein.
Figure 6B:
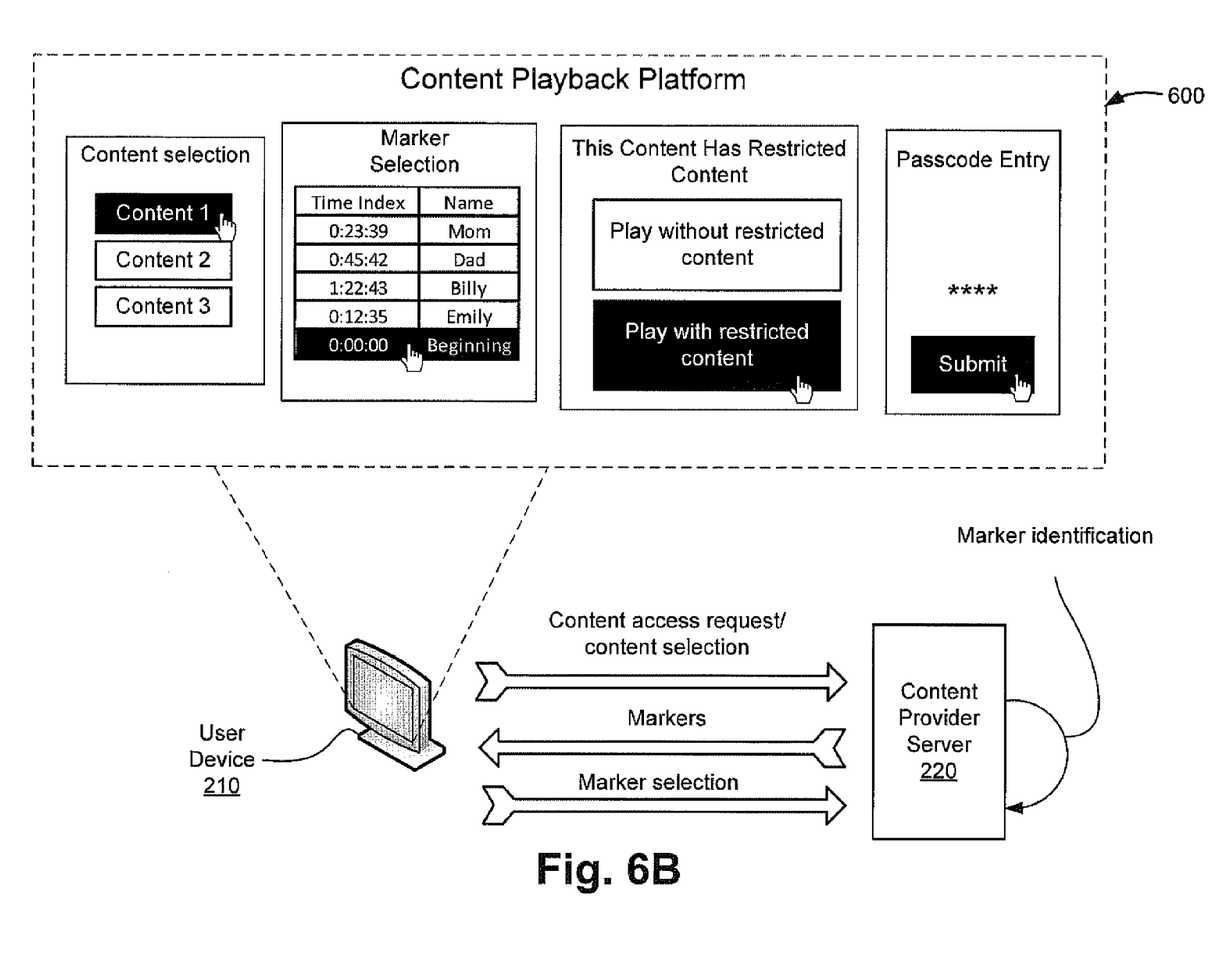

FIGS. 6A-6B illustrate an example implementation as described herein. In FIG. 6A, assume that user device 210 communicates with content provider server 220 to receive content (e.g., Content 1) and that user device 210 is currently playing the content for viewing on a display associated with user device 210. As shown in FIG. 6A, user device 210 may receive selections from a user (e.g., via interface 600) to pause content playback and to add a marker. In some implementations, user device 210 may receive a selection to add a marker identifying a time period in between two time indexes. For example, a user may select a first time index (e.g., 18:17) corresponding to when playback of the content has been paused and a starting point as to when playback of the content is to be skipped when the content is played back by user device 210. Further, the user may select a second time index (e.g., 20:23) corresponding to when the playback is to resume after being skipped. Further, the user may input a description for the marker and select a marker type (e.g., a restricted type).

In some implementations, the marker type may indicate that playback of the content, during the time period indicated by the marker, is to be skipped. For example, the "Restricted content" marker type may relate to a parental control. In some implementations, user device 210 may receive a selection of a password based on receiving the selection of the "Restricted Content" marker type. As described in greater detail below, the password may be used to allow a user to view the content without skipping playback identified by the time period associated with the marker.

Based on receiving the selections associated with the marker (e.g., the time indexes corresponding to a time period, the marker name, and the marker type), user device 210 may generate a marker management instruction and provide the marker management instruction to content provider server 220. In some implementations, content provider server 220 may execute the marker management instruction to add the marker in connection with the particular content and the user account associated with the user.

Referring to FIG. 6B, assume that at a later time, user device 210 provides, to content provider server 220 (e.g., as part of a request to access content), login information identifying the same user account used to generate the marker described in FIG. 6A. As shown in interface 600, user device 210 may present a list of content associated with the user account (e.g., corresponding to a content queue associated with the user account). In some implementations, user device 210 may receive a selection of Content 1 and may provide the content selection to content provider server 220. In some implementations, content provider server 220 may identify markers associated with Content 1 and with the user account, and may provide the markers to user device 210. In some implementations, user device 210 may present the markers in a marker list and may receive a selection of a marker.

As an example, user device 210 may receive a selection of the marker with the name "Beginning" In some implementations, user device 210 may identify that a "Restricted Content" type marker exists for Content 1 and may present an option to playback Content 1 with the restricted content or without the restricted content (e.g., by skipping playback during the time period associated with the "Restricted Content" type marker). As an example, user device 210 may receive a selection to playback Content 1 with the restricted content and may present an option for a user to input a password. In some implementations, user device 210 may authorize the playback of the restricted content (e.g., based on the inputted password and the password used to generate the marker as described above in FIG. 6A) and user device 210 may play Content 1 with the restricted content. If user device 210 receives a selection to play the Content 1 without the restricted content or when user device 210 does not authorize the playback of the restricted content, user device 210 may skip playback of Content 1 during the time period corresponding the "Restricted Content" type marker.

While a particular example is shown in FIGS. 6A-6B, the above description is merely an example implementation. In practice, other examples are possible from what is described above in FIGS. 6A-6B. Also, while a particular format of interface 600 is shown, in practice, interface 600 may have a different format and appearance than what is shown in FIGS. 6A-6B.

As described above, multiple markers for particular content may be generated such that when multiple users access the particular content via a common account, playback can be resumed from one of multiple time indexes. For example, a first user may resume playback from a first time index (e.g., corresponding to when the first user paused playback of the particular content), and a second user may resume playback from a second time index (e.g., corresponding to when the second user paused playback of the particular content). Further, markers can be shared with other users and saved to other users' respective accounts. In some implementations, markers may be provided by a publisher of the particular content and may correspond to chapters associated with the particular content. In some implementations, markers may correspond to metadata associated with the particular content, and may be automatically generated based on pixel-based classification techniques. For example, a marker can identify particular objects (e.g., people, places, items, audio, or the like) and may identify a time index in the content in which the particular objects are present.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first device, an instruction to add a first marker that identifies a first time index associated with particular content and a particular account used to access the particular content,
  the first marker being associated with a first user of the particular account;
receiving, by the first device, another instruction to add a second marker that identifies a second time index associated with the particular content and the particular account,
  the second marker identifying restricted content provided in the particular content,
  the second time index specifying a time period associated with the restricted content,
  the second marker being associated with a second user of the particular account,
    the first user being different than the second user;
storing, by the first device, the first marker and information associating the first marker with the first time index, the particular content, and the particular account;
storing, by the first device, the second marker and information associating the second marker with the second time index, the particular content, and the particular account;
receiving, by the first device, a selection of the first marker or the second marker, associated with the particular content and the particular account;
causing, by the first device, a second device to play back the particular content, including the restricted content, when the selection includes the first time index; and
causing, by the first device, the second device to play back the particular content, without the restricted content, when the selection includes the second time index.

2. The method of claim 1, further comprising:
receiving, after storing the first marker and the second marker, a request for the particular content from the second device,
  the request being associated with the particular account; and
providing information regarding the first marker and the second marker to the second device,
where receiving the selection of the first marker or the second marker includes:
  receiving, from the second device, the selection of the first marker or the second marker from the information regarding the first marker or the second marker.

3. The method of claim 1, where the instruction to add the first marker or the other instruction to add the second marker is provided by the second device or a publisher associated with the particular content.

4. The method of claim 1, where the first marker or the second marker relates to a chapter of the particular content, metadata of the particular content, an object presented in the particular content, or a point in the particular content at which playback of the particular content has been paused by a user of the second device.

5. The method of claim 1, where the instruction to add the first marker or the other instruction to add the second marker includes a description,
  the method further comprising:
    storing information associating the first marker or the second marker with the description,
    where storing the first marker or the second marker includes storing the information associating the first marker or the second marker with the description.

6. The method of claim 1, where the first marker identifies a third time index in addition to the first time index,
  the method further comprising:
    causing the second device to prevent playback of the particular content between the first time index and the third time index.

7. The method of claim 1, where the first marker identifies a third time index in addition to the first time index,
  the method comprising:
    receiving authorization information from the second device; and
    causing the second device to permit playback of the particular content between the first time index and the third time index based on the authorization information.

8. The method of claim 1 further comprising:
storing a third marker, identifying a third time index, based on storing the first marker or the second marker,
  the third time index identifying a beginning of the particular content and being selectable by the second device to cause the second device to play back the particular content from the beginning of the particular content.

9. A first device comprising:
a processor to:
  receive an instruction to add a first marker that identifies a first time index associated with particular content and a particular account used to access the particular content,
    the first marker being associated with a first user of the particular account;
  receive another instruction to add a second marker that identifies a second time index associated with the particular content and the particular account,
    the second marker identifying restricted content provided in the particular content,
    the second time index specifying a time period associated with the restricted content,
    the second marker being associated with a second user of the particular account,
      the first user being different than the second user;
  store the first marker and information associating the first marker with the first time index, the particular content, and the particular account;
  store the second marker and information associating the second marker with the second time index, the particular content, and the particular account;
  receive a selection of the first marker or the second marker, associated with the particular content and the particular account;
  cause a second device to play back the particular content, including the restricted content, when the selection includes the first time index; and
  cause the second device to play back the particular content, without the restricted content, when the selection includes the second time index.

10. The first device of claim 9, where the instruction to add the first marker or the other instruction to add the second marker is provided by the second device or a publisher associated with the particular content.

11. The first device of claim 9, where the first marker or the second marker relates to a chapter of the particular content, metadata of the particular content, an object presented in the particular content, or a point in the particular content at which playback of the particular content has been paused by the second device.

12. The first device of claim 9, where the instruction to add the first marker or the other instruction to add the second marker includes a description,
where the processor is further to:
store information associating the first marker or the second marker with the description,
where when storing the first marker or the second marker, the first device is further to store the information associating the first marker or the second marker with the description.

13. The first device of claim 9, where the second marker identifies a third time index in addition to the second time index,
where the processor is further to:
cause the second device to prevent playback of the particular content between the second time index and the third time index.

14. The first device of claim 9, where the second marker identifies a third time index in addition to the second time index,
where the processor is further to:
receive authorization information from the second device; and
cause the second device to permit playback of the particular content between the second time index and the third time index based on the authorization information.

15. The first device of claim 9, where the processor is further to:
store a third marker, identifying a third time index, based on storing the first marker or the second marker,
the third time index identifying a beginning of the particular content and being selectable by the second device to cause the second device to play back the particular content from the beginning of the particular content.

16. A non-transitory computer-readable medium for storing instructions, the instructions comprising:
a plurality of instructions which, when executed by one or more processors associated with a first device, cause the one or more processors to:
receive an instruction to add a first marker that identifies a first time index associated with particular content, a first description, and a particular account used to access the particular content,
the first marker being associated with a first user of the particular account;
receive another instruction to add a second marker that identifies a second time index associated with the particular content, a second description, and the particular account,
the second marker identifying restricted content provided in the particular content,
the second time index specifying a time period associated with the restricted content,
the second marker being associated with a second user of the particular account,
the first user being different than the second user;
store the first marker and information associating the first marker with the first time index, the first description, the particular content, and the particular account;
store the second marker and information associating the second marker with the second time index, the second description, the particular content, and the particular account,
receive a selection of the first marker or the second marker, associated with the particular content and the particular account;
cause a second device to play back the particular content, including the restricted content, when the selection includes the first time index; and
cause the second device to play back the particular content, without the restricted content, when the selection includes the second time index.

17. The non-transitory computer-readable medium of claim 16, where the plurality of instructions further cause the one or more processors to:
receive, after storing the first marker and the second marker, a request for the particular content from the second device,
the request being associated with the particular account;
provide information regarding the first marker and the second marker to the second device;
receive, from the second device, the selection of the second marker; and
cause the second device to play back the particular content at the second time index corresponding to the selection of the second marker.

18. The non-transitory computer-readable medium of claim 16, where the instruction to add the first marker or the other instruction to add the second marker is provided by the second device or a publisher associated with the particular content.

19. The non-transitory computer-readable medium of claim 16, where the first marker or the second marker relates to a chapter of the particular content, metadata of the particular content, an object presented in the particular content, or a point in the particular content at which playback of the particular content has been paused by a user associated with the particular content.

20. The non-transitory computer-readable medium of claim 16, where the plurality of instructions further cause the one or more processors to:
store a third marker, identifying a third time index, based on storing the first marker or the second marker,
the third time index identifying a beginning of the particular content and being selectable by the second device to cause the second device to play back the particular content from the beginning of the particular content.

* * * * *